United States Patent [19]

Yamauchi et al.

[11] 4,050,165

[45] Sept. 27, 1977

[54] TEACHER-STUDENTS' INTERCOMMUNICATION SYSTEM

[75] Inventors: Satoshi Yamauchi, Yokohama; Shigeru Yamazaki, Tanashi, both of Japan

[73] Assignee: Ricoh Co., Ltd., Tokyo, Japan

[21] Appl. No.: 659,649

[22] Filed: Feb. 20, 1976

[30] Foreign Application Priority Data

Feb. 25, 1975 Japan .................................. 50-23205

[51] Int. Cl.² ............................................... G09B 5/00
[52] U.S. Cl. .................................... 35/8 A; 35/35 C; 179/1 H; 179/1 MN
[58] Field of Search .............. 35/8 A, 35 C; 179/1 H, 179/1 MN

[56] References Cited

U.S. PATENT DOCUMENTS

| | | | |
|---|---|---|---|
| 3,177,594 | 4/1965 | Demo | 35/35 C |
| 3,200,516 | 8/1965 | Parker | 35/35 C |
| 4,004,354 | 1/1977 | Yamauchi | 35/48 R |

Primary Examiner—William H. Grieb
Attorney, Agent, or Firm—Cooper, Dunham, Clark, Griffin & Moran

[57] ABSTRACT

An intercommunication system in a group teaching or training system in which a teacher station and a plurality of student stations are interconnected with a common outgoing line and a common incoming line, and each station includes a transmitter and a receiver, and wherein the teacher station includes a switching circuit for selectively connecting the incoming line to the outgoing line, the transmitter and receiver in each student station are selectively connected through switching circuits to the incoming and outgoing lines, respectively, and the switching circuits in each student station may be selected in synchronism with the timing with which the teacher station sequentially scans the student station.

11 Claims, 8 Drawing Figures

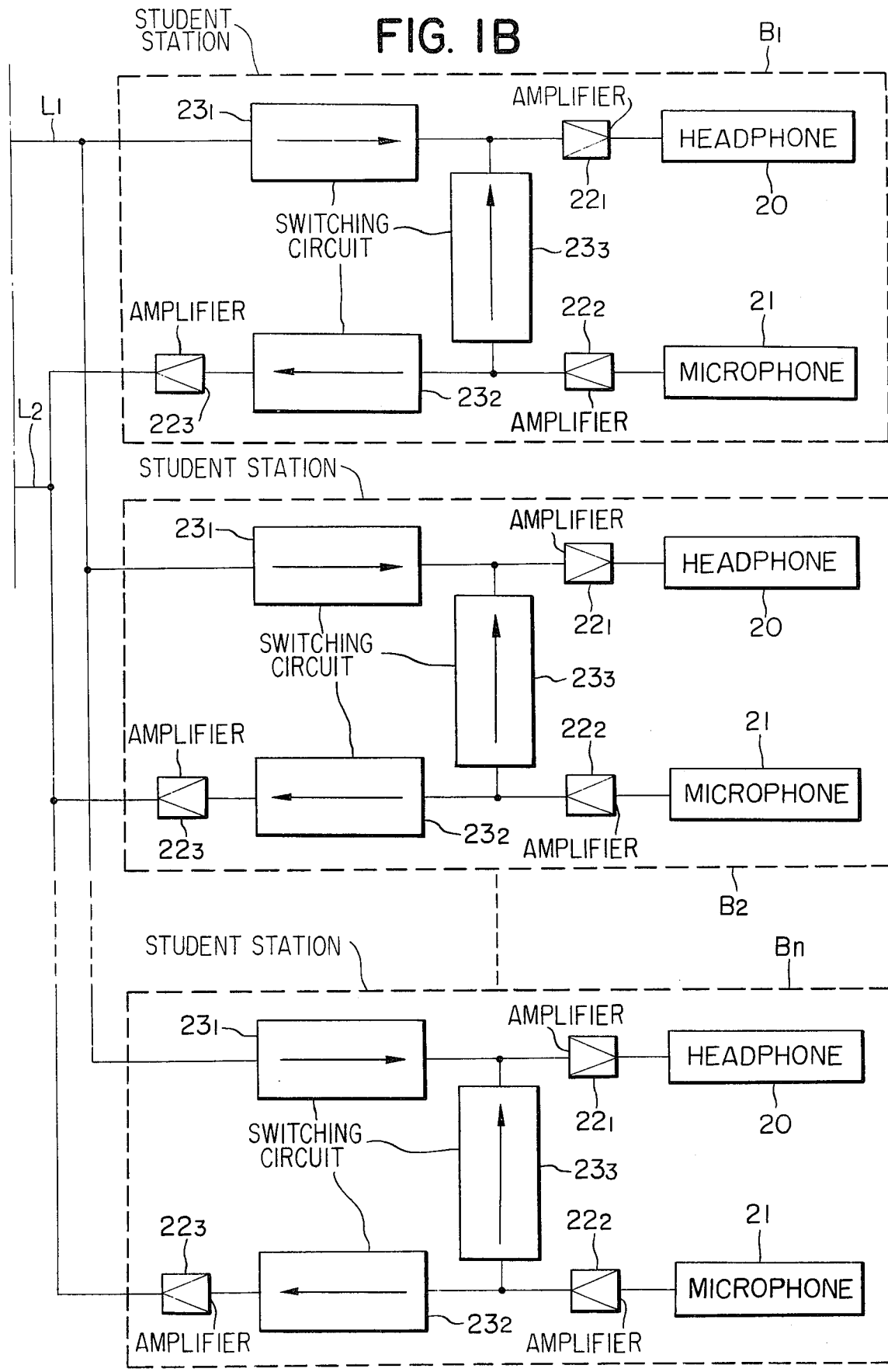

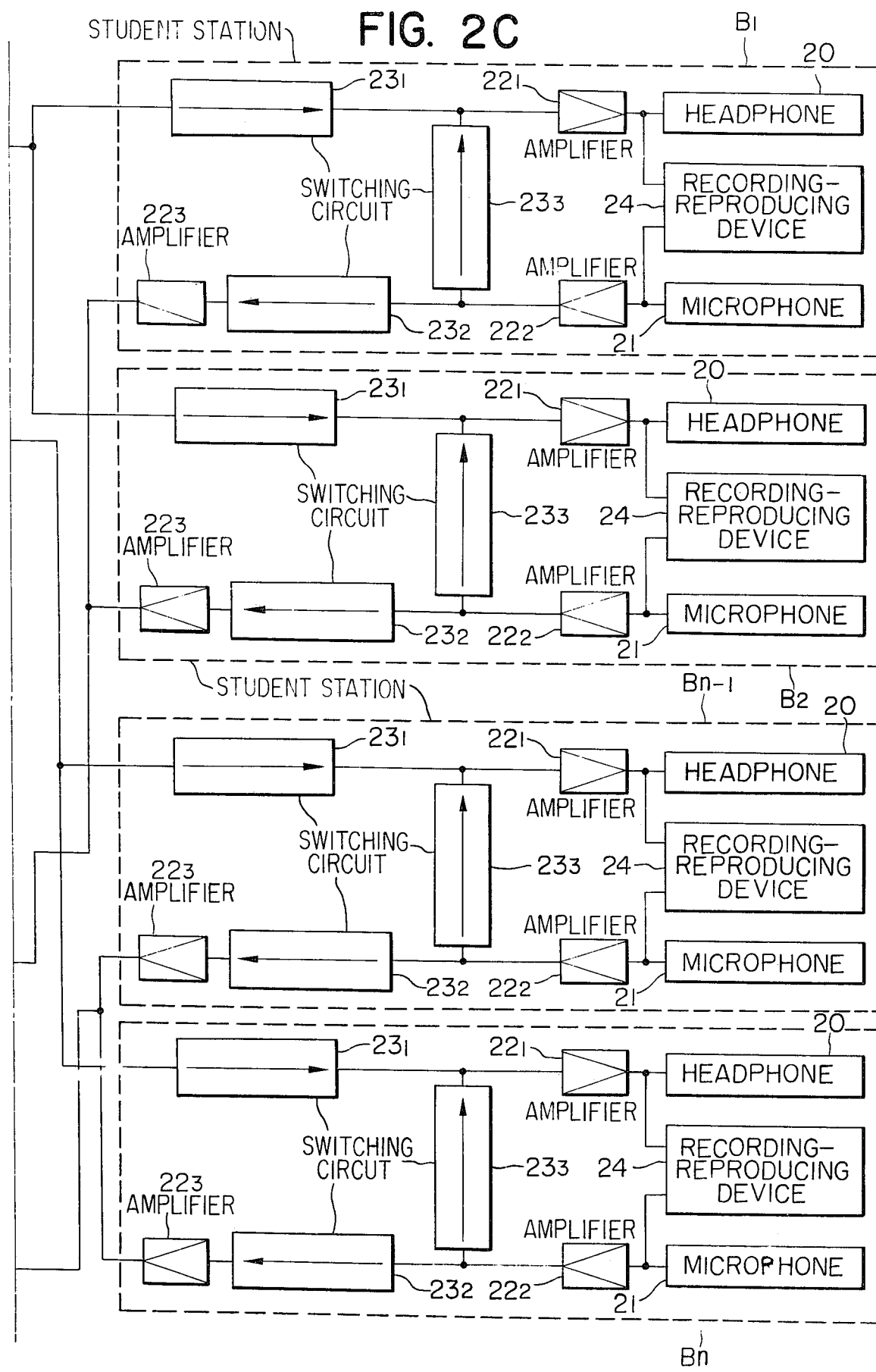

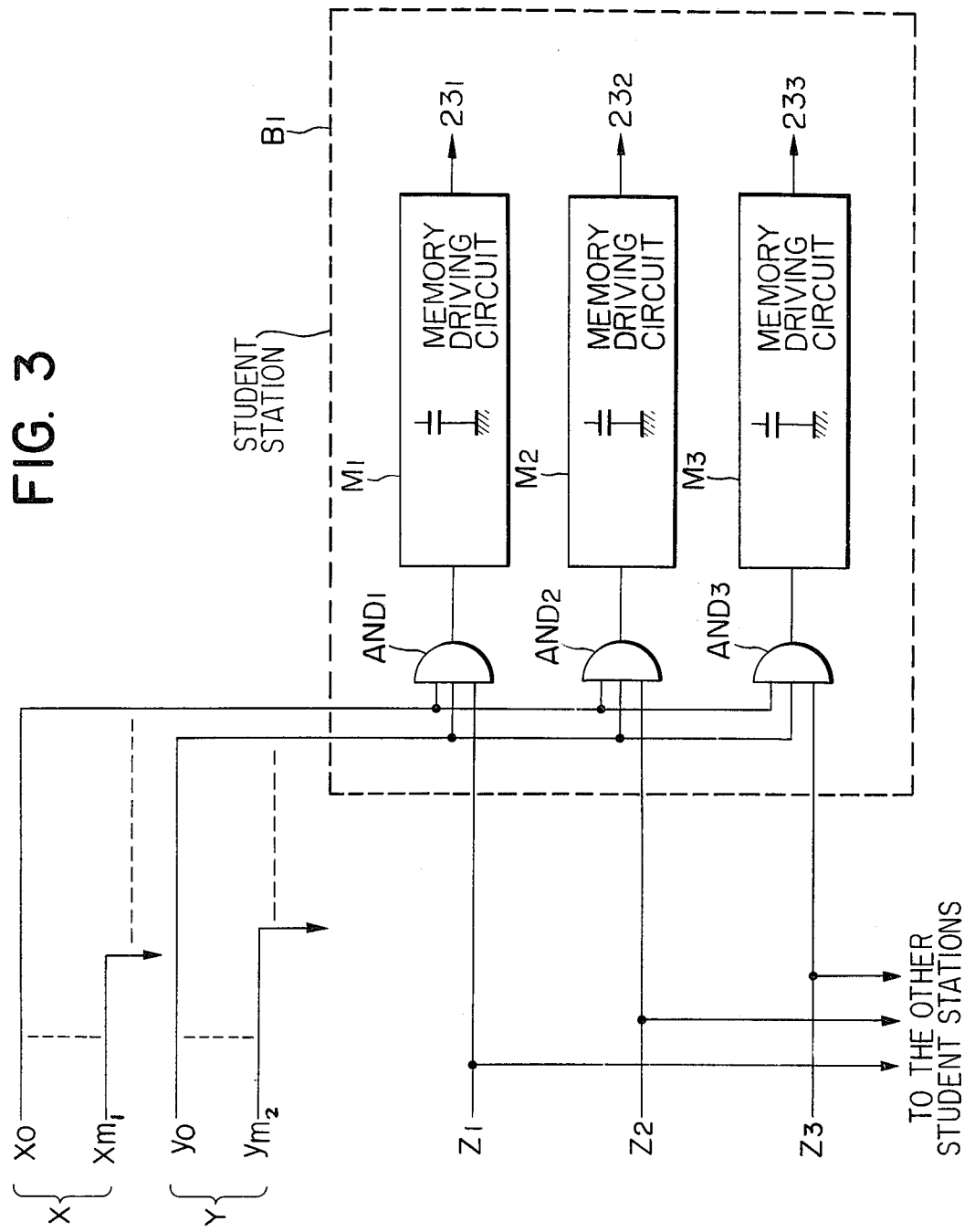

TEACHER-STUDENTS' INTERCOMMUNICATION SYSTEM

BACKGROUND OF THE INVENTION

The present invention relates to an improvement on an intercommunication system used in a group teaching or training system.

In order to improve the efficiency of group teaching or training, there have been devised and demonstrated a wide variety of group teaching or training systems in which a data processing and display system is incorporated in a teacher station while a simple answering and display system is incorporated in a number of student stations so that an exchange of information such as questions and answers may be established between a teacher and a plurality of students. If a group teaching or training system incorporated an intercommunication system which established intercommunication not only between the teacher and the students but also between the students themselves, the efficiency of group teaching or training would be further improved. However, in almost all of the conventional group teaching or training systems, the intercommunication may be established only between the teacher and a selected student or students but not among the students themselves. In some group teaching systems which may be used to establish intercommunication among the students, headphones are directly connected to the communication lines so that when too many student stations are included, a drop in signal level results. Therefore the number of student stations is necessarily limited.

SUMMARY OF THE INVENTION

One of the objects of the present invention is therefore to provide an intercommunication system for use in a group teaching or training system which may establish intercommunication not only between a teacher and a plurality of students but also between the students themselves by utilizing the common communication lines interconnecting the teacher and student stations.

Another object of the present invention is to provide an intercommunication system for use in a group teaching or training system which may establish intercommunication not only between a teacher and a student or a plurality of students and between two or more students but also between a plurality of student station groups.

A further object of the present invention is to provide an intercommunication system for use in a group teaching or training system in which each student station incorporates a magnetic recording-producing device in addition to a headphone and a microphone so that a student may monitor his conversation, reproduce the information stored in the magnetic recording-reproducing device and record the instructions given by a teacher as well as the conversation between them.

A further object of the present invention is to provide an intercommunication system for use in a group teaching or training system which may permit a teacher to monitor any student stations in such a way that a student is unaware of his being monitored.

BRIEF DESCRIPTION OF THE DRAWING

FIGS. 1, 1A, 1B and 2, 2A, 2B are block diagrams of a first and a second embodiment of an intercommunication system for use in a group teaching or training system in accordance with the present invention; and FIG. 3 is a block diagram of a circuit for controlling the on-off operations of switching circuits in each student station.

Same reference numerals are used to designate similar parts throughout the figures.

DESCRIPTION OF THE PREFERRED EMBODIMENTS

Figure 1A:
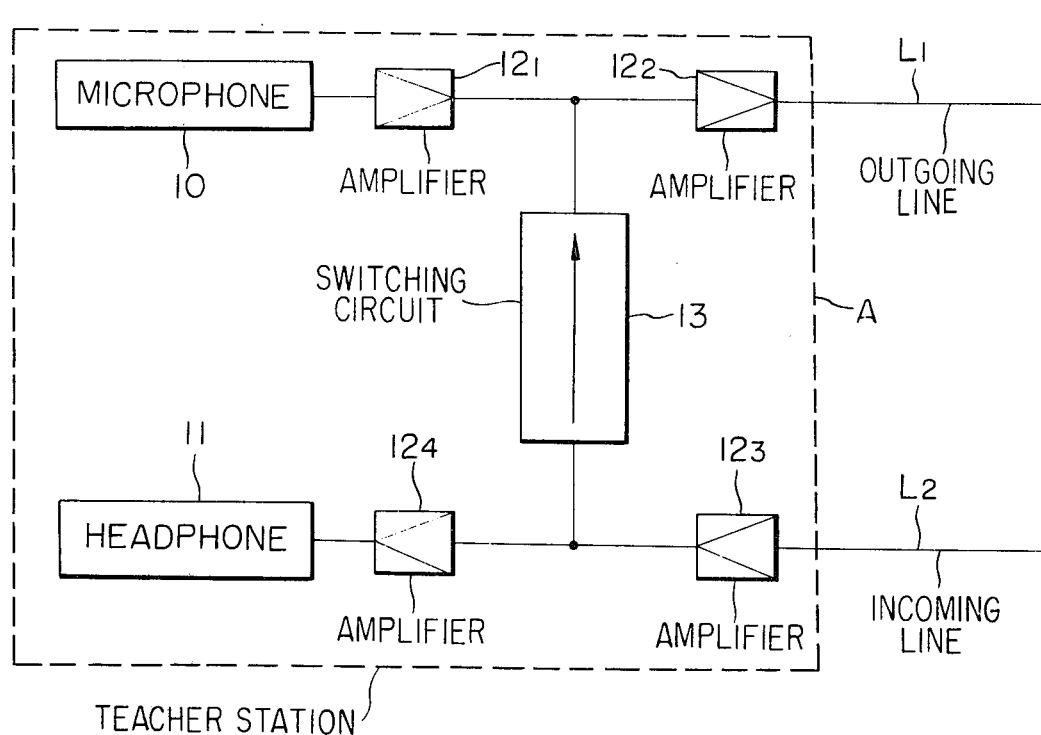
Figure 1:
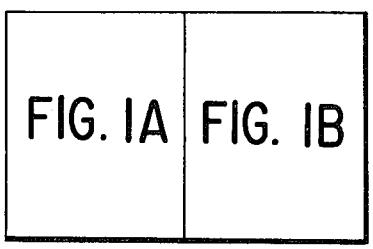

First Embodiment, FIG. 1

Referring to FIG. 1, a first embodiment of an intercommunication system for group teaching system comprises a teacher station A and a plurality of student stations $B_1$-$B_n$ interconnected through a common outgoing line $L_1$ and a common incoming line $L_2$ with the teacher station A. The teacher station A comprises a microphone 10, a headphone 11, amplifiers $12_1$ and $12_2$ for transmission, amplifiers $12_3$ and $12_4$ for reception, and a switching circuit 13 with the switching direction indicated by the arrow for interconnecting between the outgoing and incoming lines $L_1$ and $L_2$. Each student station B comprises a headphone 20, a microphone 21, amplifier $22_1$ for reception, amplifiers $22_2$ and $22_3$ for transmission, a switching circuit $23_1$ for connection with the outgoing line $L_1$, a switching circuit $23_2$ for connection with the incoming line $L_2$ and a switching circuit $23_3$ for establishing an interior loop within the student station B. A teacher may not only control the switching circuit 13 in the teacher station A but also remotely control the switching circuits $23_1$, $23_2$ and $23_3$ in the student stations $B_1$-$B_n$. These switching circuits 13, $23_1$, $23_2$ and $23_3$ may be of the transistor type as will be described in detail hereinafter.

Figure 2A:
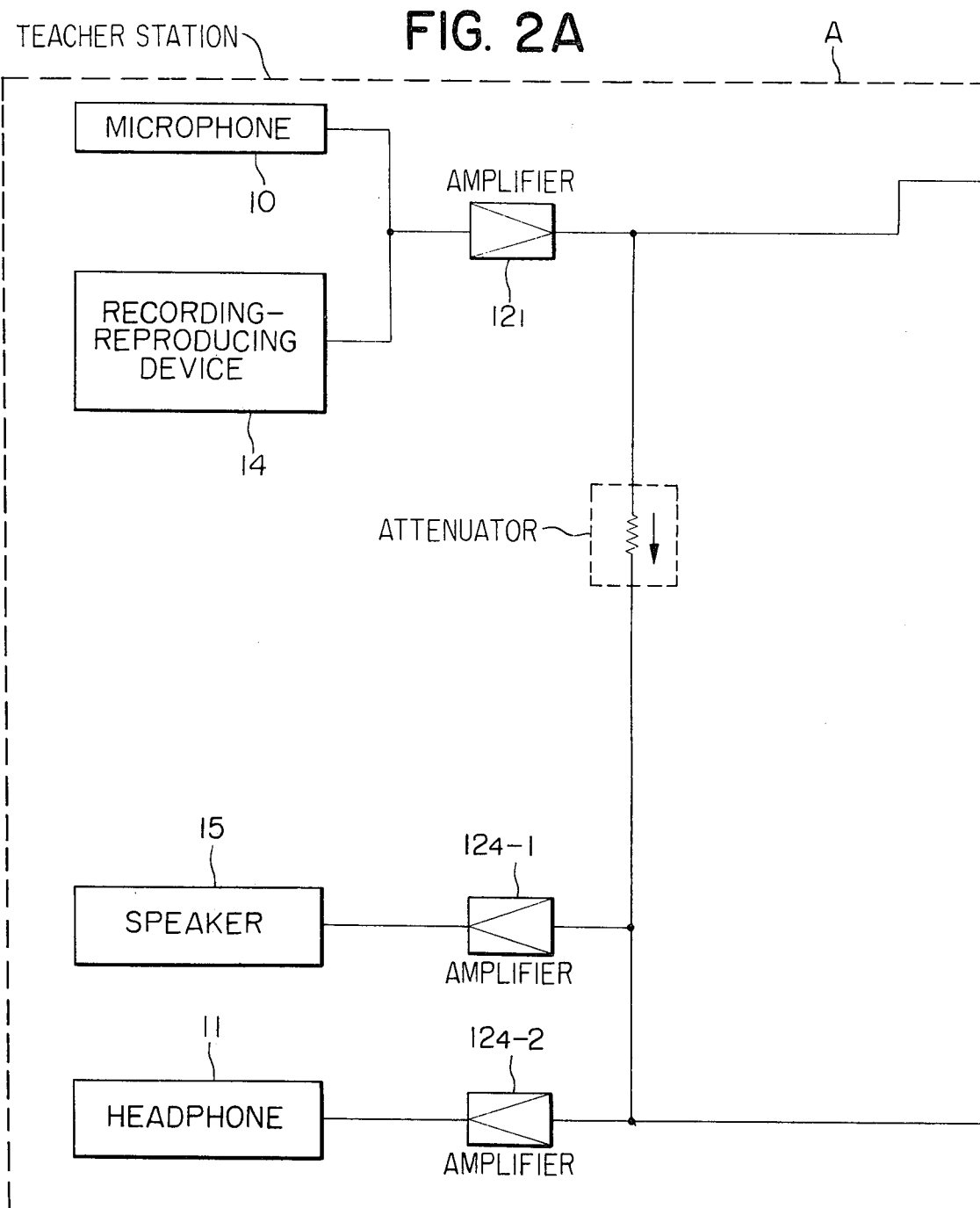
Figure 2:
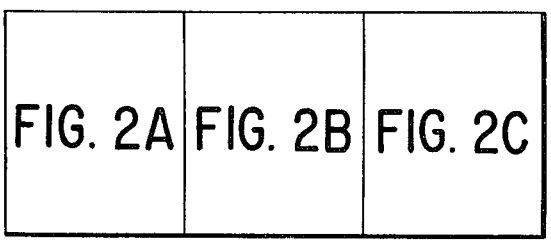
Figure 2B:
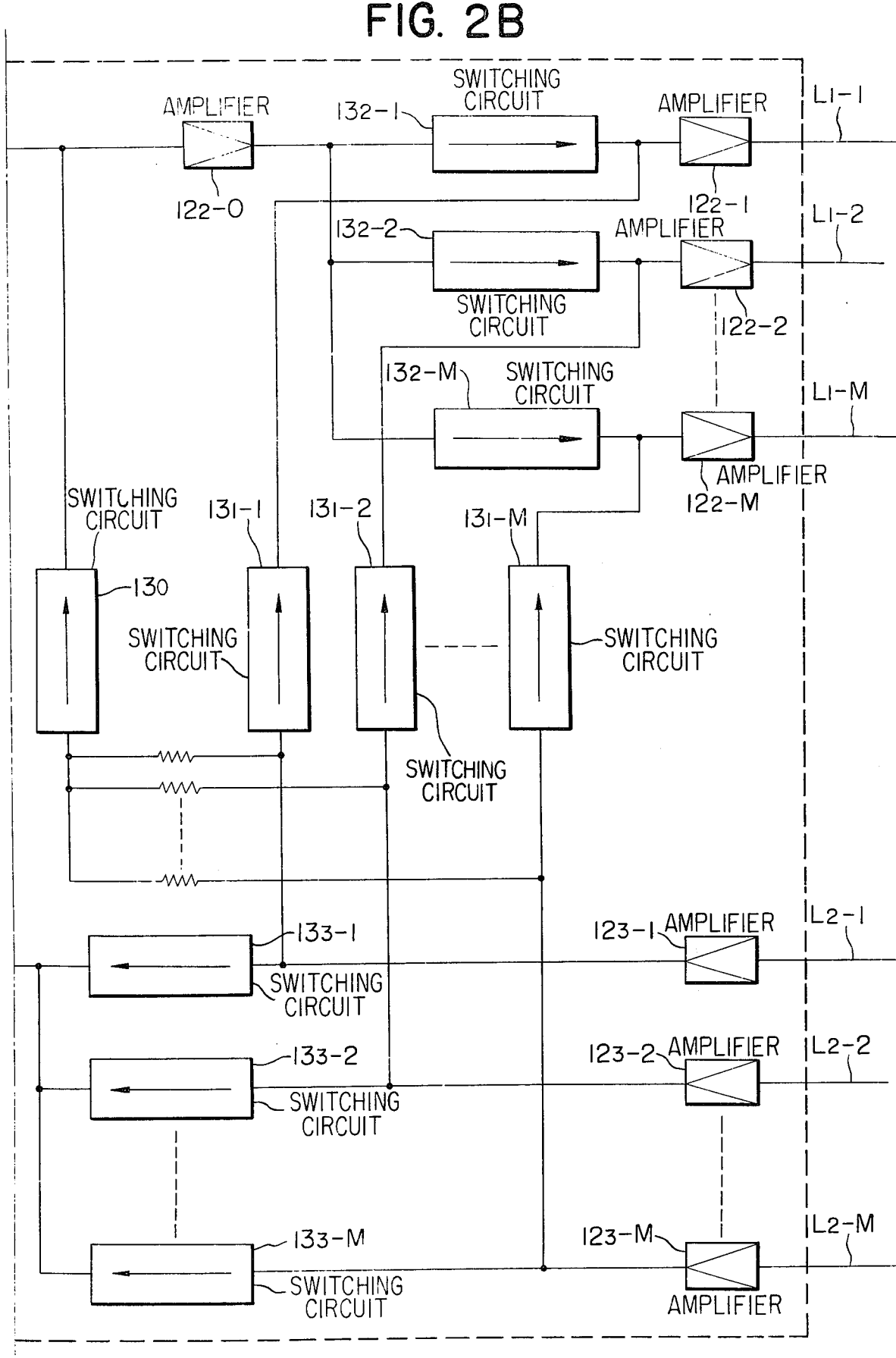

Next the mode of operation will be described. In the teacher-student intercommunication mode, the teacher turns off the switch 13 in the teacher station A and closes the switching circuits $23_1$, $23_2$ and $23_3$ in the selected student stations $B_1$-$B_n$. For the sake of explanation, the switching circuits $23_1$, $23_2$ and $23_3$ in the student station $B_1$ are assumed to be turned on. Then the teacher may transmit a question and instruction or hints to a student at the station $B_1$ through the microphone 10, the amplifiers $12_1$ and $12_2$, the common outgoing line $L_1$, the switching circuit $23_1$, the amplifier $22_1$ and the headphone 20. The answer from the student at $B_1$ may be transmitted to the teacher through the microphone 21, the amplifier $22_2$, the switching circuit $23_2$, and the amplifier $22_3$ in the student station $B_1$, the common incoming line $L_2$, the amplifiers $12_3$ and $12_4$ and the headphone 11 in the teacher station A. Since the output from the microphone 21 in the student station $B_1$ is transmitted through the amplifier $22_2$, the switching circuit $23_3$ and the amplifier $22_1$ to the headphone 20, the student may listen to or monitor what he speaks. In a like manner, the teacher may also listen to or monitor what she speaks through the headphone 11 when an attenuator (such as shown in FIG. 2) is connected in parallel with the switching circuit 13 in such a way that the output from the microphone 10 may be transmitted to the headphone 11. The teacher-student intercommunication may be established between the teacher station A and the student station $B_2$ in the same manner described above. Intercommunication between the teacher and a plurality of students may be also possible when the teacher closes the switching circuits $23_1$, $23_2$ and $23_3$ in the selected student stations B. In this case, the amplifiers $22_3$ and the switching circuits $23_2$ in the student stations $B_1$-$B_n$ transmit the signals only in the directions indicated by the arrows so the intercommunication among the students may be prevented.

In the student-student intercommunication mode, the teacher closes the switch 13 so that the signal transmitted through the incoming line $L_2$ may be transmitted through the amplifier $12_3$, the switching circuit 13 and the amplifier $12_2$ to the outgoing line $L_1$. The teacher also closes the switching circuits $23_1$ and $23_2$ in the selected student stations $B_1$ and $B_2$, for example. The speech of the student at the station $B_1$ may be transmitted through the microphone 21, the amplifier $22_2$, the switching circuit $23_2$ and the amplifier $22_3$ in the student station $B_1$, the incoming line $L_2$, the amplifier $12_3$, the switching circuit 13 and the amplifier $12_2$ in the teacher station A, the outgoing line $L_1$, the switching circuit $23_1$, the amplifier $22_1$ and the headphone 20 in the student station $B_2$. In a like manner, the speech of the student at the station $B_1$ may be transmitted through the microphone 21, the amplifier $22_2$, the switching circuit $23_2$ and the amplifier $22_3$ in the student station $B_2$, the incoming line $L_2$, the teacher station A, the outgoing line $L_1$, the switching circuit $23_1$, the amplifier $22_1$ and the headphone 20 in the student station $B_1$. As will be readily understood, the student-student intercommunication among more than two students may be also established when the switching circuits $23_1$ and $23_2$ in the selected student stations B are closed.

Second Embodiment, FIG. 2

The second embodiment shown in FIG. 2 may establish the intercommunication not only between the teacher and a student or students and between the students themselves but also between groups into which the students may be divided. In the second embodiment, the total number of student stations is assumed to be N which is divided into M number of groups; of two that is, N = 2M.

The teacher station A and the student stations $B_1$-$B_n$ are interconnected through a number of M outgoing lines $L_1$-1, $L_1$-2, ... and $L_1$-M and a number of M incoming lines $L_2$-1, $L_2$-2, ... and $L_2$-M, and each of the outgoing and incoming lines $L_1$-1 through $L_1$-M and $L_2$-1 through $L_2$-M are connected to two student stations, respectively. The student station B is substantially similar in construction to that shown in FIG. 1 except that a magnetic recording-reproducing device 24 is included so that the student may record and play back his speech and conversations with the teacher and students.

The construction of the teacher station is somewhat different from that shown in FIG. 1 because the teacher station in the second embodiment must select the desired outgoing and incoming lines out of the number of M outgoing lines and the number of M incoming lines. More particularly, the teacher station includes a number of M amplifiers $12_2$-1 through $12_2$-M for transmission connected to the outgoing lines $L_1$-1 through $L_1$-M, respectively, and a number of M amplifiers $12_3$-1 through $12_3$-M for reception connected to the incoming lines $L_2$-1 through $L_2$-M. The corresponding amplifiers $12_2$-M and $12_3$-M are interconnected through a switching circuit $13_1$-M, so that the student stations B in the same group may be intercommunicated. The outputs of the amplifiers $12_3$-1 through $12_3$-M are connected through resistors to a common switching circuit $13_0$ which in turn is connected to the input of an amplifier $12_2$-0. The output of the amplifier $12_2$-0 is branched and connected through the switching circuits $13_2$-1 through $13_2$-M to the inputs of the amplifiers $12_2$-1 through $12_2$-M. In other words, the common switch $13_0$ establishes the intercommunication among all student stations $B_1$-$B_n$ while the switches $13_1$-1 through $13_1$-M may be used to establish; intercommunication among the students in the same or different groups. Therefore the switching circuits $13_1$-1 through $13_1$-M are all turned off when the switching circuit $13_0$ is closed, and the switching circuit $13_0$ is turned off when any of the switches $13_1$-1 through $13_1$-M is turned on. In addition to the microphone 10 and the headphone 11, the teacher station A includes a magnetic recording-reproducing device 14 and a speaker 15, and switching circuits $13_3$-1 through $13_3$-M for connecting the selected group or groups to the headphone 11 or the speaker 15 respectively through amplifiers $12_4$-2 or $12_4$-1.

The second embodiment with the above arrangement may provide the following intercommunication modes:

1. When the student turns on only the switching circuit $23_3$ while turning off other switches in each student station, he may listen to his own speech or information reproduced by the magnetic recording-reproducing device 24;
2. When the teacher turns on the switching circuit $23_2$ in the selected student station and the corresponding switching circuit $13_3$-1 through $13_3$-M in the teacher station while turning off the remaining switching circuits, the teacher may monitor the selected student station while the student at this station is unaware of being monitored;
3. When the teacher closes the switching circuits $13_2$ and $23_1$ of the selected student station as well as the corresponding pair of switching circuits $23_2$ and $13_3$ in the teacher station A, intercommunication between the teacher and the selected student may be established;
4. When the teacher closes the switching circuits $23_1$ through $23_3$ of a plurality of selected student stations B and the common switching circuit $13_0$ in the teacher station A while turning off the remaining switching circuits, intercommunication between the selected student stations B may be established. When the teacher further turns on the corresponding switching circuits $13_2$ and $13_3$ in the teacher station A, the intercommunication may be established among the selected students and the teacher;
5. When the teacher turns on the switching circuits $23_1$ and $23_2$ in the student stations in the same group as well as the corresponding switching circuits $13_1$ while turning off the remaining switching circuits, the intercommunication may be established between the students in the same group. The teacher may communicate with these students by turning on the corresponding switching circuits $13_2$ and $13_3$ in the teacher station A.

Switching circuit control circuit, FIG. 3

In order to control the on-off operations of the switching operations $23_1$ through $23_3$ in the student stations $B_1$ through $B_n$ from the teacher station A, the control circuit shown in FIG. 3 may be used. The teacher station A and each student station B are interconnected with two scanning lines x and y each selected from a first scanning line group X and a second scanning line group Y. For instance, the pair of scanning lines $x_0$ and $y_0$ interconnect between the teacher station A and the student station $B_1$; the pair of scanning lines $x_1$ and $y_0$ interconnect between the teacher station A and the student station $B_2$, and so on. Under the control of the teacher station A, the pairs of scanning lines $x_i$ and $y_j$ (where $i = 0$ through $M_1$, and $j = 0$ through $M_2$) are sequentially energized to a high level so that the student stations $B_1$ through $B_n$ may be sequentially selected in a time division manner. A student station selecting system of this type is described in detail in U.S. Pat. No. 4,004,354 corresponding to; Japanese Opened Patent No. 48-42820. The teacher station A and the student stations $B_1$ through $B_n$ are also interconnected with three common control lines $Z_1$, $Z_2$ and $Z_3$ so that the teacher station A may control the on-off operations of the switching circuits $23_1$, $23_2$ and $23_3$ in each student station B. These common control lines $Z_1$ through $Z_3$ are respectively connected to the switching circuits $23_1$ through $23_3$ through respectively three-input AND gates $AND_1$, $AND_2 AND_3$, and the scanning lines $x_i$ and $y_j$ are connected to the remaining inputs of each AND gate.

Next the mode of operation of the control circuit with the above arrangement will be described. It is assumed that the signal on the control line $Z_1$ be at a high level under the control of the teacher station A. When the pair of scanning lines $x_0$ and $y_0$ are also energized to a high level, the output from the AND gate $AND_1$ rises to a high level. In response to the high-level output from the AND gate $AND_1$, a memory-driving circuit $M_1$ applies the driving signal to the switching circuit $23_1$ for a predetermined time to turn it on. In like manner, the remaining switching circuits $23_2$ and $23_3$ of the student station $B_1$ may be turned on. It will be easily understood by those skilled in the art upon referring to the Japanese Opened Pat. No. 48-42820 and corresponding U.S. Pat. No. 4,004,354 how combining of the selection switches for the students and the parallel-serial converter shifting is achieved in synchronism with the timing of the scanner. The time constant of each memory-driving circuit, which determines the operating time thereof, is selected to be at least longer than the scanning cycle in which all the pairs of the scanning lines $x_i$ and $y_j$ are sequentially energized to a high level, so that the switching circuits $23_1$ through $23_3$ in the student station $B_1$ may be kept turned on when the pair of scanning lines $x_0$ and $y_0$ are energized to a high level. The switching circuits 23 in other student stations may be controlled in the same manner as described above. It will be readily understood that the switching circuits $23_1$ through $23_3$ may not be turned on when the signals on the corresponding scanning lines are kept at a low level.

What is claimed is:

1. In an intercommunication system in which a teacher station and a plurality of student stations are interconnected with a common outgoing line and a common incoming line, the improvement wherein said teacher and student stations comprise:
    a transmitter and a receiver, the transmitter and receiver in said teacher station being respectively connected to said outgoing line and said incoming line;
    first switching circuit means in said teacher station for selectively connecting said incoming line to said outgoing line;
    second switching circuit means in each student station for selectively connecting the corresponding receiver and transmitter respectively to said outgoing and incoming lines;
    means in each student station for selectively controlling the corresponding second switching circuit means; and
    means in said teacher station for selectively controlling all of said second switching circuit means.

2. An intercommunication system as in claim 1 wherein said second switching circuit means further comprises a switching circuit for establishing an interior closed loop between the transmitter and receiver in each student station.

3. An intercommunication system as in claim 1 wherein said second switching circuit means pass a signal therethrough only in one direction.

4. An intercommunication system as in claim 1 further comprising scanning means at said teacher station for sequentially scanning said student station and means for selecting said second switching circuit means in synchronism with the timing with which the teacher station sequentially scans the student stations.

5. In an intercommunication system in which a teacher station and a plurality of student stations are interconnected with a plurality of pairs of outgoing and incoming lines, the improvement wherein said teacher and student stations comprise:
    a transmitter and a receiver, the transmitter and receiver in said teacher station being respectively connected to said outgoing lines and said incoming lines;
    first switching circuit means in said teacher station for connecting all of the incoming lines to all of said outgoing lines;
    second switching circuit means in said teacher station for selectively connecting the incoming line to the outgoing line in each pair;
    third switching circuit means in each student station for selectively connecting the corresponding receiver and transmitter respectively to the corresponding outgoing and incoming lines;
    means in each student station for selectively controlling the corresponding third switching circuit means; and
    means in said teacher station for selectively controlling said third switching circuit means in all of said student stations.

6. An intercommunication system as in claim 4 wherein each pair of said outgoing and incoming lines interconnect said teacher station and a plurality of student stations in a preselected group.

7. An intercommunication system as in claim 4 wherein said third switching circuit means further comprises a switching circuit for establishing an interior closed loop between the transmitter and receiver in each student station.

8. An intercommunication system as set forth in claim 7 wherein each student station further includes a magnetic recording-reproducing device.

9. An intercommunication system as in claim 4 wherein said second and third switching circuit means pass a signal therethrough only in one direction.

10. An intercommunication system as in claim 5 wherein said first switching circuit means is connected in parallel with each of said second switching circuit means in said teacher station.

11. An intercommunication system as in claim 5 further comprising scanning means at said teacher station for sequentially scanning said student stations and means for selecting said third switching circuit means in synchronism with the timing with which the teacher station sequentially scans the student stations.

* * * * *